United States Patent [19]

Federhen et al.

[11] Patent Number: 5,082,024

[45] Date of Patent: Jan. 21, 1992

[54] VALVE ASSEMBLY INCLUDING A HOLLOW CONDUIT

[75] Inventors: Bernd Federhen, Siegen; Manfred May, Niederfischbach, both of Fed. Rep. of Germany

[73] Assignee: Alb. Klein GmbH & Co. KG, Niederfischbach, Fed. Rep. of Germany

[21] Appl. No.: 577,261

[22] Filed: Sep. 4, 1990

Related U.S. Application Data

[62] Division of Ser. No. 342,245, Apr. 24, 1989, Pat. No. 4,955,761.

[30] Foreign Application Priority Data

Jan. 27, 1989 [DE] Fed. Rep. of Germany ....... 3902388

[51] Int. Cl.⁵ .................................................. F16K 15/14
[52] U.S. Cl. ..................................................... 137/860
[58] Field of Search ........................................... 137/860

[56] References Cited

U.S. PATENT DOCUMENTS

| | | | |
|---|---|---|---|
| 1,704,527 | 3/1929 | Becker | 137/860 X |
| 2,321,236 | 6/1943 | Parkin | 137/860 |
| 3,201,284 | 8/1965 | Ellis | 137/860 |
| 3,264,006 | 8/1966 | Downs | 137/860 X |
| 3,583,430 | 6/1971 | Toennesen | 137/860 X |
| 4,214,607 | 7/1980 | Bouteille | 137/860 X |

FOREIGN PATENT DOCUMENTS 44-1760 12/1965 Japan ........................................ 137/860

*Primary Examiner*—Robert G. Nilson
*Attorney, Agent, or Firm*—Bachman & LaPointe

[57] ABSTRACT

A valve assembly which allows air to pass in one direction in a substantially resistance-like manner while preventing the flow of air in the opposite direction. The valve assembly includes a hollow conduit having 1) an interior peripheral surface which defines a flow passage, 2) an exterior peripheral surface, and 3) a radial passage extending through the conduit for communicating the flow passage with the exterior peripheral surface. The valve assembly also includes a continuous recess formed in the exterior peripheral surface of the hollow conduit in the region of the radial passage and a valve positioned within the recess in the exterior peripheral surface and proximate to the radial passage. The valve includes a pressure ring portion and a continuous lip portion pivotably connected to said pressure ring.

3 Claims, 2 Drawing Sheets

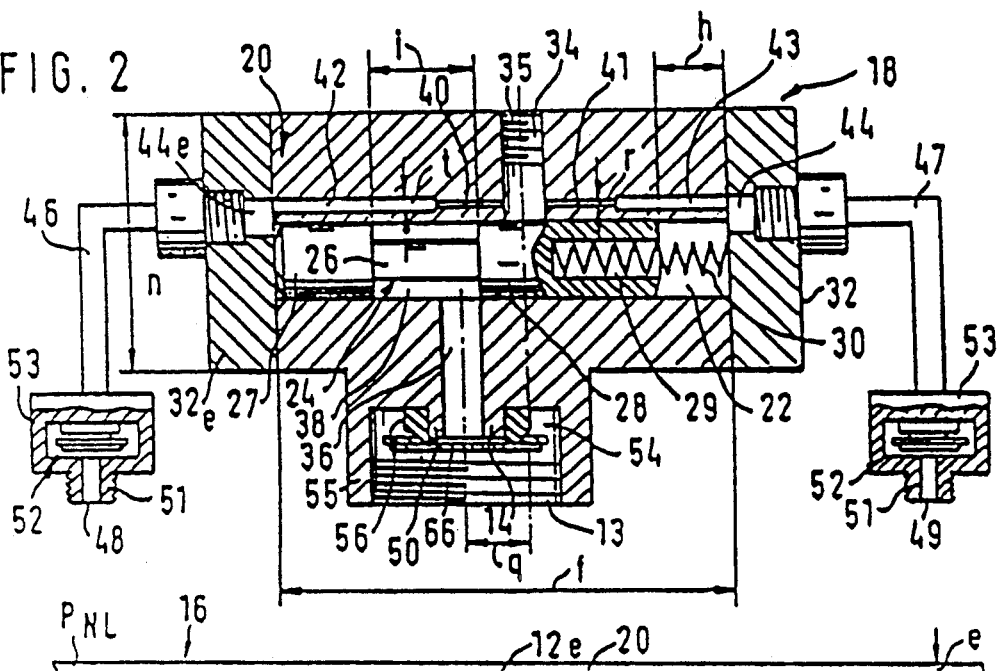
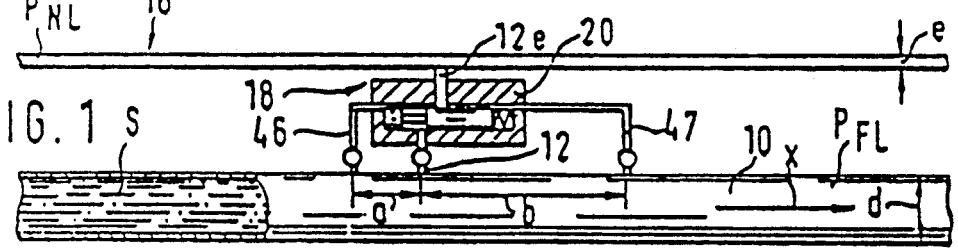
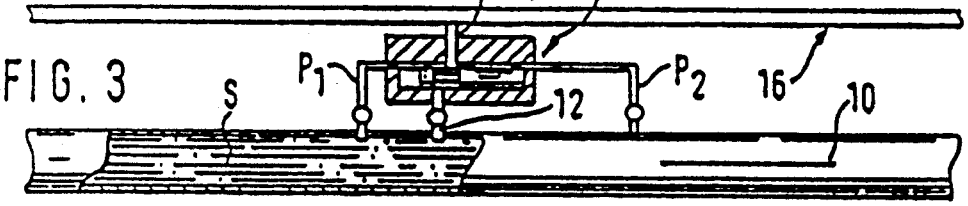
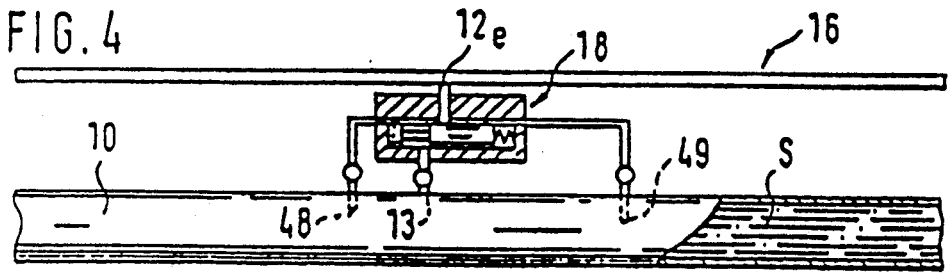

VALVE ASSEMBLY INCLUDING A HOLLOW CONDUIT

This is a division of application Ser. No. 342,245 filed Apr. 24, 1989, now U.S. Pat. No. 4,955,761.

DESCRIPTION

The invention relates to a process for pneumatically conveying material in a tubular conveyor conduit into which pressure gas is introduced—preferably transversely with respect to the direction of conveying movement—from a connecting conduit. In addition the invention concerns on the one hand an apparatus for controlling the feed of air from a secondary conduit through a connecting conduit into a conveyor conduit of a pneumatic conveyor installation, wherein the connecting conduit is adapted to be closed by a control member with an energy storage means, in particular a coil spring, and on the other hand an apparatus for closing pipe conduits.

The plug-type conveying procedure which counts among the dense-flow conveying processes is used for transporting bulk material through a piper as carefully as possible at a low speed and with a low conveying pressure. That conveying process is of particular significance in relation to products which are abrasive or which are sensitive in regard to abrasion wear. As it is possible to achieve high rates of through-put of material with small amounts of air, the level of energy costs remains low.

If only a small amount of conveying air is introduced into the bulk material at the beginning of a conveyor conduits, plugs are automatically formed, which are separated from each other by cushions of air.

In particular at bends in the conveyor conduit however, plugs may be pushed together during the conveying operation, and finally the plugs may attain such a length that the conveyor pressure is no longer adequate to maintain transportation of the material. Added to that is the fact that the pressure for displacing a plug is dependent not only on the length thereof but also on the porosity of the plug; particularly when dealing with bulk materials with a wide range of grain sizes, plugs of different levels of porosity occur.

It is known that the level of air pressure required for conveying the plugs through the conveyor conduit can be considerably reduced by feeding air into the plugs. Various apparatuses have been proposed for that purpose.

Thus German patent specification No. 3 323 739 describes a connecting conduit which can be closed by a spring-loaded diaphragm; the diaphragm is disposed between two air chambers and is subjected to the influence of a coil spring. In accordance with the teaching of German patent specification No. 3 323 739, a large number of pneumatically connected shut-off valves with chambers and diaphragms is required; conveying air is additionally introduced into the conveyor conduit only at the locations at which there is in fact a plug, and loosens up the plug. The air is injected into plugs and diaphragms where and when the pressure difference between two adjacent shut-off valves exceeds a predetermined value.

A disadvantage in such an apparatus is that a plurality of shut-off valves are always required, even when the loosening effect of the injected jet of air would be required only at a given location on the conveyor conduit, for example on a bend. In addition the diaphragm must be capable of withstanding the differential pressure between two injection locations, as a result of which the apparatus is sluggish in its reaction.

A further disadvantage is the fact that the system consisting of the diaphragm, spring and air pressure is undamped so that at corresponding pressure conditions the diaphragm does not fully open but begins to flutter. The air which flows from the secondary conduit through the shut-off valve to the conveyor conduit when the valve seat is open additionally acts on the diaphragm so that actuation thereof may not arise just out of the pressure in the conveyor conduit.

In another design configuration as is put forward for example by German patent specification No. 3 024 568, air is introduced into the conveyor conduit—constantly or in a time-cycled fashion—at certain spacings at which there is then no material being conveyed. There is the disadvantage in that arrangement that in that way the amount of conveying air in the conveyor and thus the speed of conveying movement constantly increases and the conveying air cannot be put to optimum use. The attempt has been made, comparatively unsuccessfully, to compensate for the rise in speed, by increasing the size of the conveyor conduit in a stepwise manner.

Having regard to that art, the inventor set himself the aim of providing a process and an apparatus of the kind set forth in the opening part of this specification, with which the recognized disadvantages of the known processes and apparatuses are eliminated.

That problem is solved in that, in the event of a rise in pressure in the conveyor conduit, in the direction of conveying movement, upstream of the connecting conduit which is connected to a secondary conduit at high pressure, the connecting conduit is opened for the pressure gases by an air flow supplied from the conveyor conduit directly to the connecting conduit and, when pressures are equal in the conveyor conduit in the region upstream and downstream of the mouth opening of the connecting conduit, said air feed is interrupted again.

The connecting conduit extends between the conveyor conduit and a secondary conduit which carries a higher pressure than the conveyor conduit, and the connecting conduit is held in a closed condition until the pressure increases in the conveyor conduit, by a control member which is held in a defined normal position by an energy storage means. When the pressure in the conveyor conduit rises, in accordance with the invention, the control member moves against the force of the energy storage means, with a higher pressure in a first sensor conduit, in such a way that pressure air flows from the secondary conduit into the conveyor conduit; when there is equality of pressure in the first sensor conduit and a second sensor conduit, the control member moves back into its normal position. Thus, in accordance with the invention, the control member is a slider or spool which is disposed in the connecting conduit and which closes off the connecting conduit in a normal position and which is arranged in a flow chamber between the first and second sensor conduits which at their other ends each open into the conveyor conduit at different sides of the connecting conduit.

A further feature of the invention provides that each of the sensor conduits is connected by way of a throttle section to the portion of the connecting conduit which leads to the secondary conduit; the throttle sections of narrow cross-section preferably extend parallel to a longitudinal bore in a housing block, the bore forming the flow chamber.

The slider or spool advantageously comprises two piston bodies which are connected at a spacing by a portion of narrower cross-section, in particular by a slider bar, wherein the piston bodies are mounted in the longitudinal bore with axial play determined by the extent of relative displacement of the conduit portions of the connecting conduit, at least one of the piston bodies being supported against the axially operative energy storage means; the portion of narrow cross-section, that is to say the slider bar, opens the communication of the connecting conduit, when the slider is in an open position in which it is moved towards the energy storage means.

It is in accordance with the invention for the mouth openings of the connecting conduit portions which can be separated from each other by the slider or spool, or of transverse bores, which are connected to said connecting conduit portions, in the housing block, to be displaced in the longitudinal bore laterally relative to each other, that is to say radially with respect to the transverse bores, by an axial extent which is less than the axial length of said slider bar, ensuring that there is a clear separation between the normal position of the slider and the open position thereof.

Designing the control member in the form of a housing block with a longitudinal bore for the slider, and throttle bores for the sensor conduits, provides a simple structure which nonetheless in highly effective. The use of a single device of that kind is appropriate to ensure control of the entire conveyor operation. The sensor conduits which open into the conveyor conduit at different spacings at respective sides of the connecting conduit represent parts of a branch conduit from the conveyor conduit, in contrast to the known state of the art. The branch conduit crosses the connecting conduit outside the longitudinal bore, but is also connected with the ends thereof, to carry air therein.

An aspect of particular significance in regard to opening and closing the conduits is a valve which is arranged upstream in the direction of flow of the mouth opening locations of the connecting conduit and/or the sensor conduit or conduits; the valve has an elastic lip which is associated with a conveyor gap and which opens or closes same in dependence on pressure.

The valve is a valve for controlling the flow of a fluid from a first chamber at high pressure to a second chamber at low pressure, for distributing the fluid in the last-mentioned chamber or for securely and permanently closing off an undesired flow from the conveyor conduit to the accompanying conduit when the pressure in the latter was to be reduced below that of the conveyor conduit, even when the fluid contains foreign bodies.

In commercially available non-return valves with a spring-loaded piston member, foreign bodies stick to the rigid sealing surfaces and give rise to leaks and difficulties in movement of the moving components. For that reason they require a high opening pressure and do not reliably close in the other direction of flow. They are expensive to produce. The fluid flowing therethrough is not distributed over a large area. In regard to those deficiencies, a remedy is afforded by a valve in which an elastic lip on a ring which is generally V-shaped in cross-section opens or closes the fluid flow path.

In particular embodiment of that valve the V-shaped ring is carried on a body with flow ducts and bears against the elastic lip of a second such ring or against a fixed surface.

If the pressure in the first chamber is higher than the pressure in the second camber, the flowing fluid lifts the sealing lips and the fluid is distributed at the periphery of the lips. The lips flutter as a result of the flow and thus loosen any foreign bodies clinging thereto.

If the pressure in the second chamber is higher than the pressure in the first chamber, it supports the sealing force of the sealing lips.

What are known as V-rings have found to be highly suitable for use as the sealing element. Such rings are used as seals in relation to the radial movement of shafts at pressure-less locations.

The ring of the valve according to the invention with its lip which is inclined with respect to a radial plane is formed from wear-resistant elastomer materials. The valve of that design configuration can now be used in accordance with the invention for example as an air distribution means in fluidisation devices in the field of dust storage containers or pneumatic pressure vessel conveyors and as an non-return valve in pneumatic control systems.

By virtue of that valve, in the apparatus as set forth in claim 2, a flow from the conveyor conduit to the accompanying conduit is reliably prevented. For, it has been found that, when a plurality of apparatuses for controlling the feed of air, with a common secondary conduit, are arranged over the course of a conveyor conduit, the function thereof can be adversely affected; the pressure in the conveyor conduit drops from the beginning thereof towards its end. If an apparatus at the end of the conveyor conduit opens simultaneously with an apparatus in the region of the beginning of the conveyor conduit, then the pressure obtaining at the end of the conveyor conduit may fall away; in the region of the beginning of the conveyor conduit, air can flow from the conveyor conduit through the apparatus into the accompanying conduit. When that happens, filters which are provided in that arrangement become clogged with fine dust.

Further advantages, features and details of the invention will be apparent from the following description of a preferred embodiment and with reference to the drawing in which:

FIG. 1 is a diagrammatic view in longitudinal section through an apparatus according to the invention with a control member in the normal position thereof;

FIG. 2 is a view in longitudinal section through the control member, on a enlarged scale in comparison with FIG. 1;

FIGS. 3 and 4 show the apparatus of FIG. 1 in two operating positions different from that shown in FIG. 1;

Figure 7:
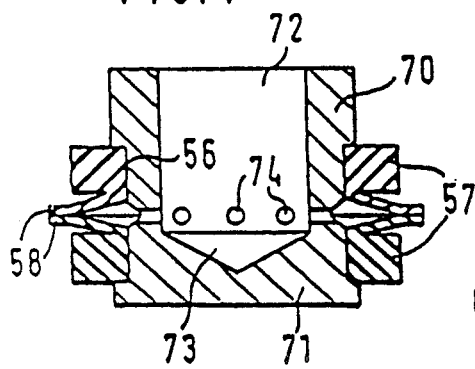
FIG. 7 is a view in cross-section through an elastic member from FIGS. 5 and 6.
Figure 8:
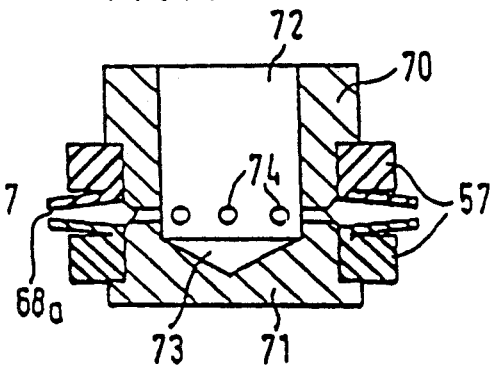
FIGS. 8 and 9 show another detail with elastic members in two operating positions.

Reference numeral 10 denotes a conveyor conduit of a diameter d for bulk material S which is moved in the direction indicated by the arrow x. Extending at a right angle from the conveyor conduit 10 is a connecting conduit 12, the mouth opening of which is indicated at 13 in FIG. 1 and which at the other end is connected to a secondary conduit 16 by a portion $12_e$, by way of an interposed control member 18. In this case the diameter e of the secondary conduit 16 approximately corresponds to one fifth of the diameter d of the conveyor conduit 10.

The control member 18 has a housing block 20 of a length f and a width n which is shorter than same, with a longitudinal bore 22 which extends in the longitudinal direction, for a slider or spool 24. The slider or spool 24 comprises two stud-like piston bodies 27 and 28 which are connected by an axial slider bar 26. One of the piston bodies 27, 28 is axially bored and in a blind bore 29 accommodates one end of a coil spring as an energy storage means 30. The spring force of the energy storage means 30 or coil spring can be varied by means of an adjusting screw (not shown).

The coil spring 30 projects out of the piston body 28 and bears with its free end against an end plate 32 which closes off the longitudinal bore 22 and which is fixed to the housing block 20. A corresponding end plate $32_e$ covers over the other end of the longitudinal bore 22.

In the normal position of the slider 24, as shown in FIGS. 1 and 2, the piston body 28 which accommodates the coil spring 30 is disposed at a spacing h with respect to the adjacent end plate 32 and masks a transverse bore 34 which extends upwardly in FIG. 2 from the longitudinal bore 22. The portion $12_e$ of the connecting conduit leading to the secondary conduit 16 is connected to the screwthread 35 in the transverse bore 34. A second transverse bore 36 extends with axis parallel to the transverse bore 34, and displaced by a distance q, between the longitudinal bore 22 and the connecting conduit portion 12 which is directed towards the conveyor conduit 10.

A particularly suitable form of the slider 24 involves lapped metal sliders without soft seals, which already move at pressures of 2 KP (Kilopascals) so that the desired deferential pressure for the shift operation is determined by the force of the energy storage means. It will be appreciated that it is also possible to use sliders or spools with soft seals or rolling diaphragms.

In the normal position of the slider 24 the transverse bore 36 opens into an annular chamber 38 which defined by the longitudinal bore 22 and the axial slider bar 26; the transverse bores 34 and 36 are thus separated from each other in that position by the piston body 28.

Narrow ducts of a diameter r of preferably 1 mm extend as throttle sections 40 and 41 from the upper transverse bore 34 on both sides thereof, in parallel relationship to the longitudinal bore 22. The throttle sections 40 and 41 each go into an axial bore 42 and 43 of larger diameter t. The bores 42 and 43 each communicate by way of a connecting chamber 44 and $44_e$ respectively with first and second sensor conduits 46 and 47 which connect to the conveyor conduit 10 at connecting locations 48 and 49 at different spacings a and b respectively with respect to the mouth opening 13 of the connecting conduit 12 (see FIGS. 1 and 4).

The air pressure $P_{NL}$ obtaining in the secondary conduit 16 is usually higher than the pressure $P_{FL}$ in the conveyor conduit 10 which, as described, is separated from the secondary conduit 16 by virtue of the piston body 28 in the normal position of the slider 24. If for example due to a plug S which approaches in the conveyor conduit 10, the pressure $P_1$ in the first sensor conduit 46 rises—the sensor conduit 46 is connected on the one hand to the upper portion $12_e$ of the connecting conduit by way of its throttle section 40 and on the other hand to the longitudinal bore 22 by way of the connecting chamber $44_e$—, then the slide or spool 24 moves in the direction of conveying movement x against the force of the coil spring 30 until the annular chamber 38 embraces both transverse bores 34 and 36 and therewith both portions $12_e$, 12 of the connecting conduit; pressure air $P_{NL}$ flows from the secondary conduit 16 into the conveyor conduit 10 (FIG. 3).

When the plug S which is acted upon by compressed air has passed the mouth opening 13 of the connecting conduit 12 and the mouth opening 49 of the second sensor conduit 47, the pressure in the two sensor conduits 46 and 47 is equalised again and the slider or spool 24 slides back into its normal position.

A very small amount of air flows through the sensor conduits 46 and 47, that air being taken from the secondary conduit 16 and being determined in regard to its quantity by the throttle sections 40 and 41.

As shown in FIG. 2, valves 50 and 52 are fitted between the transverse bore 36 or the sensor conduits 46, 47 on the one hand and on the other hand the mouth opening locations 13 or 48, 49 at which the air to produce the loosening effect or the air which is passed through the throttle sections 40 and 41 is introduced, the valves 50 and 52 being provided inter alia to prevent particles of dirt from passing into the longitudinal bore 22 or reaching the slider or spool 24 when the apparatus is shut down.

Figure 5:
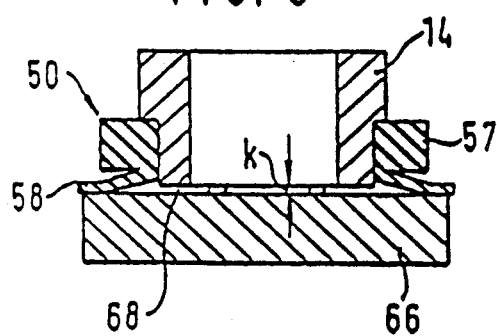
FIGS. 5 and 6 show details on an enlarged scale from FIG. 2 with a sealing lip in two mutually different operating positions.
Figure 6:
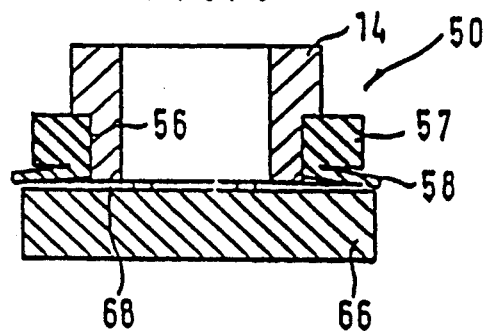
Figure 9:
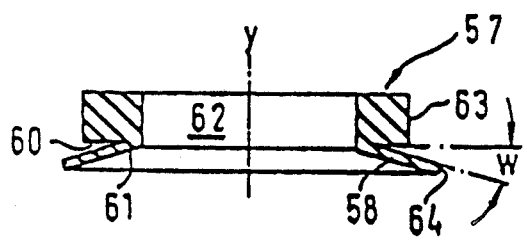

The valve 50 on the connecting conduit 12 is disposed in the interior 54 of a tubular connecting portion 55 and, as shown in FIGS. 5 and 6, comprises in a shoulder-like step or recess 56, a pressure ring 57 which embraces the end 14 of the connecting conduit 12, the ring having an outwardly inclinedly projecting annular lip 58. It is separated from the elastic ring 57 by a wedge-shaped gap 60 in such a way that its pivotal connecting location 61 is adjacent the inside surface 62 of the ring. The outer edge 64 of the lip is outside the outside surface 63 of the ring. In addition, in the closed position, as shown in FIGS. 1 and 5, the annular lip bears against a transverse plate 66 which is associated at a spacing K with the end 14 of the connecting conduit 12, while in the open position as shown in FIG. 6, it opens an annular gap 68.

The ring 57 is formed integrally from wear-resistant elastomeric materials, with its annular lip 58 which is inclined at an angle w in the direction of low as indicated at y. Another valve 52 is only indicated in FIG. 1 at the ends of the sensor conduits 46 and 47, with its valve housing 53 which includes the tubular connecting portion 51.

The end 70 of the sensor conduit 46, 47 is closed by a bottom member 71, above which radial through openings 74 are provided in the sensor conduit 46, 47. The interior 72 of the end member 70 forms at the bottom a downwardly directed cone configuration 73.

In this arrangement, shoulder-like steps or recesses 56 are provided on both sides of the ring of openings 74, for receiving two pressure rings 57 whose annular lips 58 bear against each other in the closed position, while in the open position they open a flow gap $68_a$ therebetween.

The above-described valve 50 reliably prevents any flow from the conveyor conduit 10 to the secondary conduit 16 in the event of a relative drop in pressure in the latter; when a plurality of apparatuses for controlling the feed of air are arranged on the conveyor conduit 10, with a common secondary conduit 16, the function thereof can be adversely affected as the pressure in the conveyor conduit 10 drops from the beginning thereof towards its end. If an apparatus at the end of the conveyor conduit 10 opens simultaneously with an apparatus in the region of the beginning thereof, then the pressure obtaining at the end of the conveyor conduit is reduced. Without the valve 50, air would now flow in the region of the beginning of the conveyor conduit, from the conveyor conduit 10 through the apparatus into the secondary conduit 16.

We claim:

1. A valve assembly comprising: a hollow conduit, said hollow conduit having 1) an interior peripheral surface which defines a flow passage, 2) an exterior peripheral surface, and 3) radial passage means extending through said conduit for communicating said flow passage with said exterior peripheral surface; a continuous recess formed in the exterior peripheral surface of said hollow conduit in the region of said radial passage means; valve means positioned within said recess in said exterior peripheral surface and proximate to said radial passage means, said valve means comprising 1) a pressure ring portion having an inside surface abutting said recess and an outside surface which extends beyond said exterior peripheral surface, and 2) a continuous lip portion pivotably connected to said pressure ring at said inside surface and extending in a substantially radial direction therefrom beyond said outside surface of said pressure ring; and seat means adjacent said continuous lip portion for selectively sealing and unsealing said radial passage means upon pivoting of said continuous lip portion so as to allow for flow through said radial passage means in one direction.

2. A valve assembly according to claim 1 wherein said recess extends above and below said radial passage means and said pressure ring portion is located above said radial passage means and said seat means is located below said radial passage means.

3. A valve assembly according to claim 2 wherein said seat means comprises 1) a pressure ring portion having an inside surface abutting said recess and an outside surface which extends beyond said exterior peripheral surface and 2) a continuous lip portion pivotably connected to said pressure ring at said inside surface and extending in a substantially radial direction therefrom beyond said outside surface wherein the continuous lip portions of said valve means at said seat means seal and unseal for controlling the flow of fluid through said radial passage means.

* * * * *